Patented Dec. 29, 1931

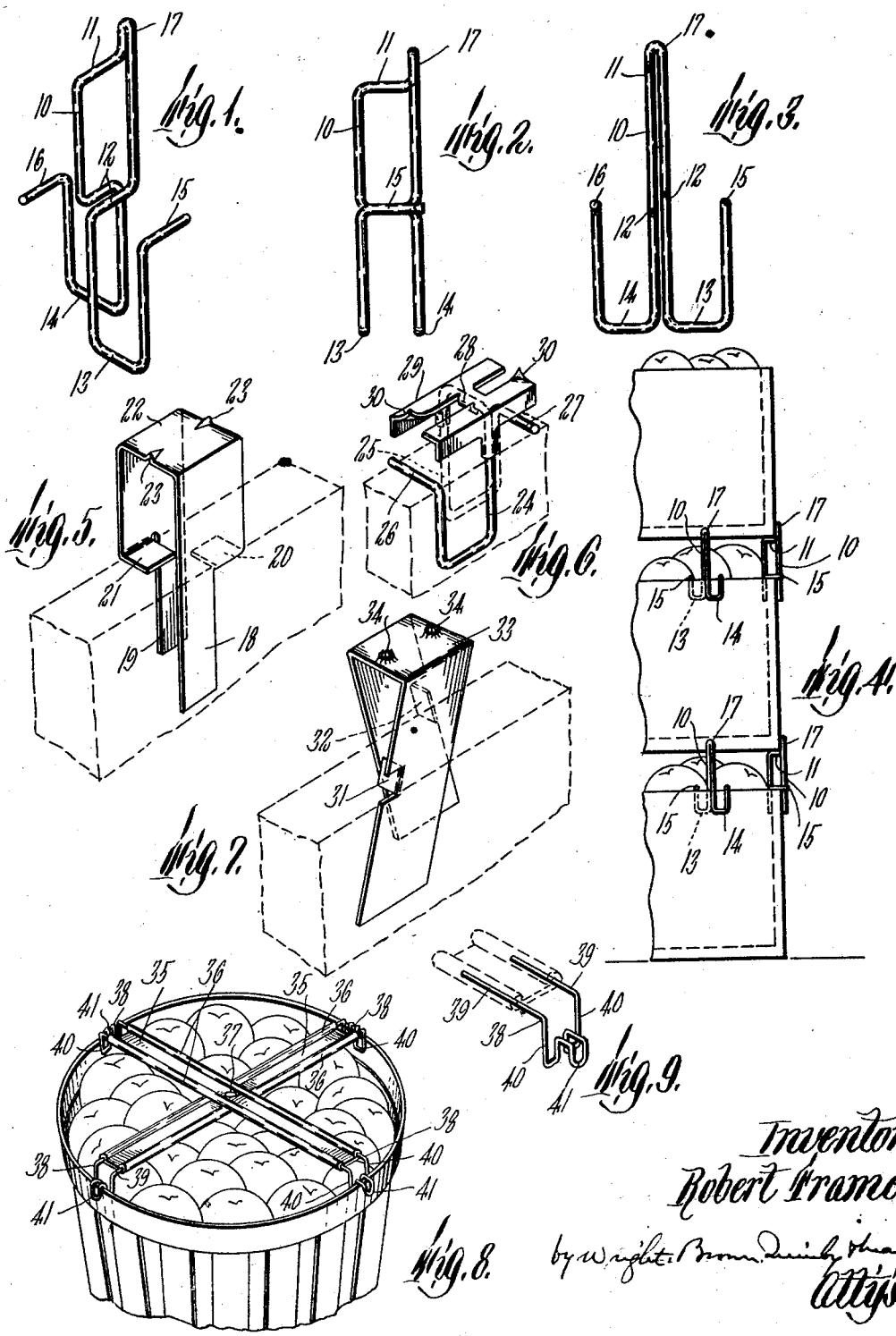

1,838,754

UNITED STATES PATENT OFFICE

ROBERT FRAME, OF CANTERBURY, NEW HAMPSHIRE

SPACING DEVICE FOR CONTAINERS

Application filed November 6, 1929. Serial No. 405,147.

This invention relates to spacing devices for containers such as boxes, baskets, crates, and the like which may be piled in tiers. In marketing fruit or the like, the present day tendency is to pack in boxes rather than barrels, this applying especially to the better grade of fruit. In order to fill the boxes properly, the upper layer of fruit usually projects to some extent above the plane of the upper edge of the box. The fruit is packed this way particularly for the purpose of preventing motion of the fruit in the box during shipment by providing the box with a thin flexible cover which is sprung over the top of the fruit and thus holds it in place. This bulge on the top of an unlidded box makes necessary a spacing of boxes when they are piled in tiers, since otherwise the weight of the upper boxes injures the upper layer, at least, of the fruit in each box below.

It is the purpose of the present invention to provide spacing devices which are simple, inexpensive, and efficient, and which not only hold the boxes in a tier vertically spaced but also prevent the boxes from lateral movement one on the other. To this end I provide a spacer preferably made of metal so as to have the requisite strength with minimum weight, the device being adapted to fit on the upper edge portion of a box or similar container and to engage the bottom of a similar container thereabove.

For a more complete disclosure of the invention, reference may be had to the description thereof which follows and to the illustration thereof on the drawings, of which,—

Figure 1 shows in perspective an embodiment of the invention.

Figure 2 is an end elevation of the spacer shown in Figure 1.

Figure 3 is a side elevation of the same.

Figure 4 illustrates a number of spacers such as shown in Figure 1 in operation with a tier of boxes.

Figure 5 is a perspective view of a modified form of spacer.

Figures 6 and 7 are other modified forms of the invention.

Figure 8 is a further modification especially adapted to baskets or other receptacles which may taper toward the bottom.

Figure 9 shows in perspective a detail of the spacer shown in Figure 8.

The embodiment of the invention illustrated in Figures 1 to 3 may comprise a single length of wire suitably bent to shape as shown. This wire may be formed in the shape of a closed loop 10 having an approximately rectangular shape. The portion 11 of the wire comprising the upper end of the rectangular loop is adapted to receive and support the bottom of a box or container when used with others as shown in Figure 4. The end portions of the wire, after being bent in opposite directions as at 12 to form the lower end of the rectangular loop 10, are extended downwardly into open loops 13, 14, these loops being preferably in spaced parallel planes which may be substantially perpendicular to the plane of the loop 10. The open loops 13 and 14 are adapted to rest against the inner and outer surfaces of the box so that their planes are suitably spaced according to the thickness of the material of which the side walls of the box are made. The extreme end portions 15 and 16 may be bent to lie in a common plane with the lower end 12 of the rectangular loop. Thus the portions 12, 15 and 16 are all adapted to rest on the upper edge surface of a box and to be supported thereby, the portions 15 and 16 being substantially spaced apart along the edge of the box so as to cooperate with the loops 13 and 14 in holding the closed loop 10 upright. In order to prevent lateral movement of an upper box relative to the box beneath it, the wire forming the loop 10 may be provided with an upstanding kink 17 adapted to rest against the outer face of a box, as shown in Figure 4. These are intended for use on all four sides of the box so that lateral motion in any direction relative to the box below is thus prevented.

Figure 5 illustrates a modified form of the device. A strip of sheet metal of suitable stiffness may be bent into an inverted U shape, as shown. The arms of the U may be provided with elongated downwardly extending portions 18 and 19 to engage the inner and outer surfaces of the box. Suitable tabs 20 and 21 may be bent inwardly, these tabs being equally spaced from the base 22 of the U member so as to rest on the upper edge surface of a box and to support the base 22 at a suitable distance above the box edge. On the upper surface of the base 22, one or more sharp projections 23 may be struck up presenting upwardly extending points to enter the bottom of a box placed thereon sufficiently to prevent lateral motion thereof with respect to the box beneath.

Figure 6 illustrates an embodiment of the invention comprising a length of wire bent into a pair of open loops 24, 25, the mutually remote legs of these loops being adjacent to respective end portions 26, 27 of the wire which are bent into a plane perpendicular to the planes of the loops 24, 25. The mutually adjacent legs of the loops 24, 25 extend upwardly above the portions 26, 27 and are connected by a bridging portion 28 above the plane of the end portions 26, 27. The end portions 26, 27 are adapted to rest on the upper edge of a box so that the bridging portion 28 is supported above the upper edge of a box to receive the bottom of another box to be placed thereon. In order to prevent side slip of a box thereon, I may secure to the bridge portion 28 a metal piece 29 having upwardly extending points 30 adapted to sink into the bottom of the box above sufficiently to prevent lateral movement thereof on the metal piece 29. In the example illustrated in Figure 6 the metal piece 29 may be composed of a small piece of sheet metal having portions embracing the bridge member 28 and the upright legs of the loops 24 and 25 contiguous thereto. One or more corners 30 may be bent upwardly to form the upwardly projecting points.

Figure 7 illustrates another modified form of the invention. The spacer therein shown may comprise a strip of sheet metal bent in U-shape, a pair of tabs 31, 32 being bent inwardly from opposite edges of the two legs of the U. These tabs are adapted to rest edgewise on the top edge of a box, as shown, so that the transverse portion 33 of the spacer is supported at a desired distance above the edge of the box. In order to prevent lateral motion of a box superimposed thereon, one or more points 34 may be struck up from the surface of the transverse portion 33 to engage the bottom of a box placed thereon. This may be conveniently accomplished by driving a prick punch upwardly through the member 33.

Figure 8 illustrates a form of the invention particularly adapted for use with baskets or other receptacles having a larger area across the top than across the bottom. This form of spacer may include a pair of metal strips 35, the edges of which may be curled inwardly as at 36 to stiffen the strip as a whole. The strips may be loosely held together as by a suitable rivet 37 or the like at their mid points, this rivet being sufficiently loose to permit one strip to turn upon the other so that the device may be collapsed for packing, or may be opened out, as shown, for use. The strips 35 may be supported as by suitable members 38 which may conveniently be formed of bent wire. As shown in Figure 9, each member 38 may comprise a pair of upper end portions 39 adapted to project into the bores of the tubular ribs 36. By adjustably sliding the portions 39 in or out, the device as a whole may be adjusted to containers of different diameters. Extending upwardly from the end portions 39 are a pair of upright portions 40 by which the strips 35 are spaced above the edge of the container below. The portion of the member 38 between the uprights 40 may be bent into the form of a hook 41 adapted to fit over the upper edge of a basket or similar container.

I claim:

1. A device for spacing tiered receptacles having side walls, said device having an upstanding portion and being adapted with other similar devices to receive and support a receptacle placed thereon, means on said upstanding portion including upwardly projecting points for holding a receptacle thereon against lateral motion, and a lower portion adapted to engage both sides of a wall of a receptacle, to maintain said upstanding portion in an upright position.

2. A device of the class described, comprising an element having portions adapted to rest on the top edge surface of an open container, a pair of members extending downwardly against the inner and outer surfaces respectively of the container, and an upwardly extending portion adapted with the upwardly extending portions of other similar elements to support a second container spaced above said top edge surface.

3. A device of the class described comprising a pair of spaced bearing portions adapted to rest on the top edge surface of an open container, a pair of legs extending below said bearing portions and adapted to rest respectively against the inner and outer surfaces of said container, and a portion above said bearing portions and adapted to be engaged by the bottom of a container to be supported.

4. A spacing device adapted to rest on the upper edge of an open box, comprising bearing portions adapted to rest on said upper edge, a pair of legs extending below said bearing portions and adapted to rest respectively against the inner and outer surfaces of the box, a pair of uprights extending above said bearing portions, and a support portion bridging said uprights and adapted to be engaged by the bottom of a box to be supported.

5. A spacing device adapted to rest on the upper edge of an open box, comprising bearing portions adapted to rest on said upper edge, a pair of legs extending below said bearing portions and adapted to rest respectively against the inner and outer surfaces of the box, a pair of uprights extending above said bearing portions, a support portion bridging said uprights and adapted to be engaged by the bottom of a box to be supported, and means for restricting horizontal movement of a box on said support portion.

6. A spacing device for open boxes in a tier, comprising a metal strip in the form of an inverted U with a transverse portion and a pair of legs extending downwardly therefrom and adapted to engage respectively against the inner and outer surfaces of a box, means adapted to engage the top edge of a box at spaced points along said edge to support said transverse portion above said edge, and means on said transverse portion for restricting horizontal movement of a box resting thereon.

In testimony whereof I have affixed my signature.

ROBERT FRAME.